Patented Nov. 25, 1947

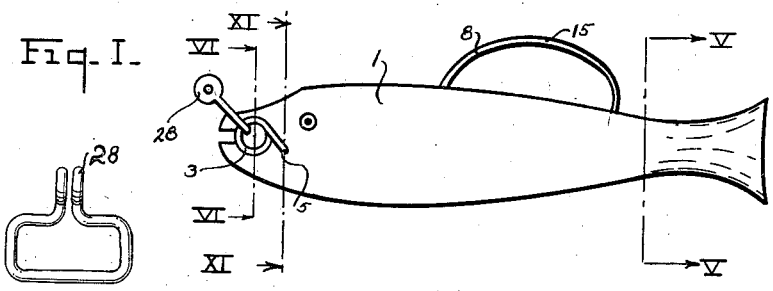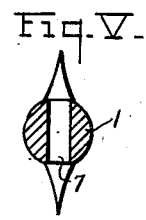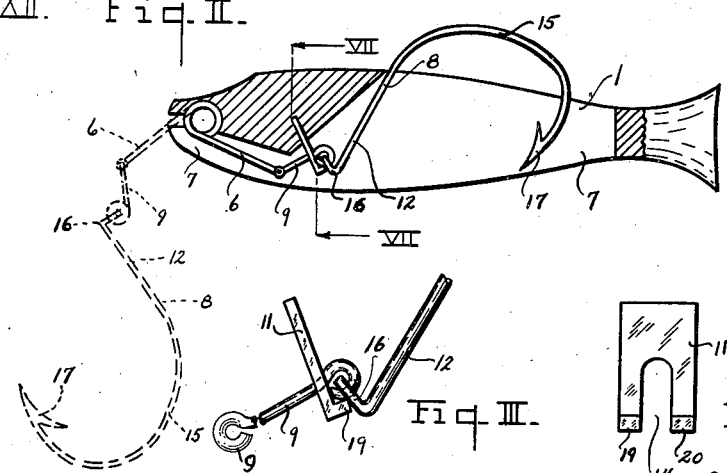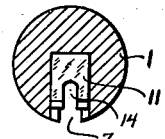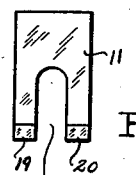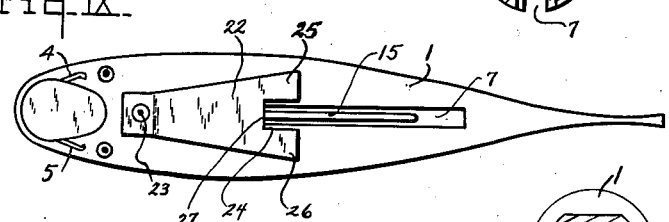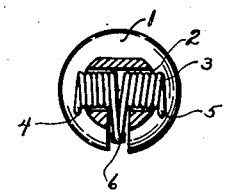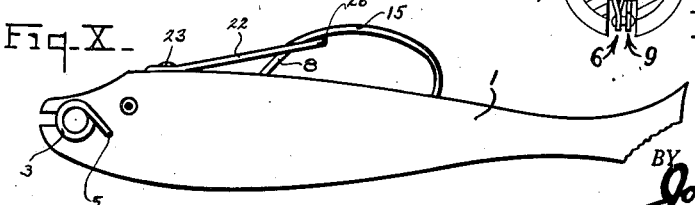

2,431,434

UNITED STATES PATENT OFFICE 2,431,434

ARTIFICIAL FISHHOOK LURE

Olaf Tallaksen, Chicago, Ill., assignor of one-half to Joseph B. Lindecker, Skokie, Ill.

Application January 15, 1944, Serial No. 518,311

7 Claims. (Cl. 43—35)

My invention relates to improvements in artificial lures, and has for its principal object to provide a bait adapted to be used in casting or trolling for fish and embodying a fish-like body, and a spring actuated hook with the barb and adjacent portion substantially concealed within said body and adapted to be released by a fish in the act of grabbing the bait, thus causing the same to be automatically thrown outward from the lure body and forward along the lure, thus setting the hook into the flesh of the fish.

A further object of the invention is to provide a lure of simple and durable construction which provides means to keep the hook set, and the point concealed, so that when so set the device may be drawn through the weeds or past obstructions without said pointed hook catching on to the same.

It is a well known fact that when a fish strikes an artificial lure, and feels the hook or the nature of the lure, said fish immediately lets go of the lure and if the angler is not on the alert and does not jerk the line to set the hook, the fish will escape, and it is with the above and other objects in view, the nature of which will more fully appear as the description proceeds, that the invention consists in the novel construction, combination and arrangement of parts as herein fully described, illustrated and claimed.

In the accompanying drawings: Figure I is a side elevation of a lure having my invention embodied in its construction, and showing the hook in its normal set position locked within a kerf within the body. Figure II is a longitudinal sectional view of the lure showing the construction of the same. Figure III is an enlarged fragmentary view showing means for arresting the spring in extreme tension. Figure IV is a plan view of a novel shaped catch plate as shown in Figure III. Figure V is a transverse vertical sectional view taken on line V—V of Figure I. Figure VI is a transverse vertical sectional view taken on line VI—VI of Figure I. Figure VII is a transverse vertical sectional view taken on line VII—VII of Figure II through the lure with parts removed to show the shape of the kerf or slot to receive the catch plate. Figure VIII is a view similar to Figure VII with the catch plate in position. Figure IX is a plan view of the lure with hook in set position and showing a trigger attachment as can be used on large lures. Figure X is a side elevation of the improved lure shown in Figure IX, with hook in set position. Fig. XI is a sectional view taken on line XI—XI of Fig. I. Fig. XII is an enlarged view of the line attaching means. Fig. XIII is an enlarged view of the eye formed on the shank end of the hook.

Similar numerals refer to corresponding parts in the several views. The numeral 1 indicates the body of the artificial bait constructed of wood or other suitable material; such as, metal, rubber, plastic or any other strong and durable material out of which it might be modeled or shaped to resemble a minnow or small fish. The body is provided with a recess to form a transverse cavity as shown at 2 in which is mounted a coiled spring 3. The coiled spring 3 is inserted into the head portion of the fish and secured or fastened therein in any convenient manner, the coiled spring being so designed that it has three extended members one at each end and one member in the center. The two end terminals 4 and 5 of the spring 3 are bent and inserted through the surface into the body of the lure. The central section of the spring is provided with the operating terminal 6. With the end terminals 4 and 5 extending into the body of the lure, the body of the spring is held in a fixed position within the transverse cavity 2. The body 1 is provided with a longitudinally and diametrically disposed groove or kerf 7 adapted to receive the spring terminal 6, a novel fish hook 8, and a connecting slip link 9. The body 1 is further provided with a transverse recess or slot 10 to receive a catch plate 11. The spring terminal 6 is connected to the link 9, and the link 9 is connected to the shank end 12 of the hook 8. When the spring 3 is released it swings the hook 8 outwardly and forwardly away from the lure as shown dotted in Figure II. Numeral 14 designates a slot in plate 11 to receive the body portion of a link 9 when a hook 8 is in set position. Hook 8 is provided with a central portion 15, an eye 16, and a barbed end 17. The eye 16 is designed to rest against the outwardly projecting end members 19 and 20 of said plate 11 when the hook 8 is in set position. As shown in Figures I and II, the central portion 15 of said hook 8 is designed to project outside the plane, or upper surface, of said body while barbed end 17 is concealed while said hook is in set position.

When the hook 8 is in the position indicated in Figures I and II, the barbed end 17 of the hook can not engage with weeds as it is drawn through the water. A slight inward pressure upon the central portion 15 of the hook caused by a fish when grabbing at the lure, will cause the eye 16 to assume a different position with reference to the end members 19 and 20 of the plate 11. The spring 3 is thus allowed to pull the hook 8 from its set position, at which time the hook will swing outwardly and forwardly with great speed and force away from said lure to set the barbed end 17 into the mouth or head portion of the fish.

When large lures are used, it is often desired to employ a trigger attachment 22 as shown in Figures IX and X. This trigger is attached to the top of the lure at 23, and it is provided with a slot 24 and end members 25 and 26. The members 25 and 26 are positioned to assume a place on each side of the hook portion 15, with a central portion 27 of the trigger resting upon said hook 8. It is obvious that when a fish grabs at a large lure it will either strike the trigger 22 or the hook portion 15 causing inward pressure thereon and releasing said hook for striking action, thus making the catch certain.

It is seen that the parts are so designed that the leverage obtained necessitates only a slight pressure on the central portion of the hook to release the same; however, the action produced when the lure hits the water at time of casting will not release the hook and allow the spring to snap said hook outward and away from said lure.

The lure is usually tapered toward its opposite ends and provided with the usual line attaching elements 28, extending horizontally through the central portion of the coil spring 3.

While the drawings show a rotating type coil spring, it is obvious that various types of springs can be used to obtain the objects of this invention, and for this reason I do not limit myself to any one particular type of spring.

Having shown and described two forms which my invention may assume in practice, I do not desire that it be confined to the specific details of the structure as illustrated, it being understood that changes may be made in the form, proportion, and organization of its several parts without departing from the spirit of my invention as indicated in the appended claims.

What I claim is:

1. An article of the character described including, in combination, a body, a kerf in said body, a reactive spring connected with said body, a hook loosely joined with said spring by means of a separate link and adapted to swing in front of and completely away from said body, and a locking means for releasably retaining both ends of said hook within said kerf and the central portion of said hook outside the plane, or upper surface, of said body.

2. An article of the character described including in combination, a body, a kerf in said body, a transverse cavity in the forward end of said body, a reactive spring connected with said cavity and with said body, a hook loosely joined with said spring by means of a separate link, and locking means cooperating with said link and said hook for releasably retaining both ends of said hook within said kerf and allowing the central portion of said hook to extend outside said lure body, said hook being adapted by inward pressure thereon to be released from said locking means and be forcibly moved outwardly and forwardly completely away from said body by said spring.

3. An article of the class described including, in combination, an elongated body having a transverse cavity in the forward end thereof, and a longitudinally and diametrically disposed kerf therein, a hook adapted to have both ends thereof received within said kerf while the central portion thereof extends outside of said body, and a coiled spring disposed in said transverse cavity and secured to said body, said spring and the shank end of said hook being loosely joined together, locking means within said kerf, said shank end being provided with means to engage with the locking means to releasably retain the pointed end of said hook in concealed position within said kerf, the hook being adapted by inward pressure thereon to be released from said locking means and to swing outwardly and forwardly away from said body.

4. A fishing lure, comprising a fish-like body having a recess therein, a coiled spring mounted within the forward end of said recess, a hook disposed within the rear end of said recess, a link connecting said spring with the shank end of said hook, and a hook retaining means within said recess and adapted to releasably hold the point of the hook within the plane of said body and allowing the body of the hook to extend outside the lure body, the said hook being also adapted by inward pressure thereon to be released from said retaining means and to allow said reactive spring to swing said hook outward and away from said body.

5. A fishing lure, comprising a fish-like body with a transverse cavity in the forward end thereof in combination with a longitudinal and diametrical kerf, a reactive spring mounted in the forward end of said cavity, a fish hook disposed in the rear end of said kerf, loose link type means connecting said spring and said hook, and releasable holding means for retaining the point of said hook within said kerf and allowing the central portion of said hook to extend outside the lure-body, the said hook being adapted by inward pressure thereon to be released from said holding means and allowed to swing outwardly.

6. A fishing lure including, in combination, a fish-like body, means at one end thereof for the attachment of a fish line, a transverse cavity disposed in said end, a kerf disposed longitudinally and diametrically in said body, a retaining means within said kerf, a hook adapted to be received within said kerf, a coiled spring secured within said cavity, and a loose link type member disposed in said kerf connecting said spring with the shank end portion of said hook, said shank end being provided with means to engage retaining means within said kerf whereby to releasably retain the point end of said hook concealed within the body, said spring being reactive to swing said hook outwardly, the central body portion of said hook extending outside of the lure body and being adapted by inward pressure thereon to release the entire hook and free it from said body.

7. An article of the class described including in combination, an elongated body having a transverse slot in the forward end thereof, a longitudinal slot in said body, a coil spring having an actuating arm in said longitudinal slot, a hook adapted to be secured to said spring actuating arm, and a catch secured in said body, said catch being provided with means to hold said hook in set position, and said hook being adapted to be released from said catch to allow said spring to swing it outwardly and forwardly away from said body.

OLAF TALLAKSEN.

REFERENCES CITED

The following references are of record in the file of this patent:

UNITED STATES PATENTS

| Number | Name | Date |
|---|---|---|
| 886,794 | Gilmore | May 5, 1908 |
| 1,017,088 | Dremel | Feb. 13, 1912 |
| 1,381,003 | Pierson | June 7, 1921 |
| 1,808,565 | McLaughlin | Jan. 2, 1931 |